US010757453B2

(12) United States Patent
Kale et al.

(10) Patent No.: US 10,757,453 B2
(45) Date of Patent: Aug. 25, 2020

(54) DISTRIBUTED MULTI-DATACENTER VIDEO PACKAGING SYSTEM

(71) Applicant: Amazon Technologies, Inc., Seattle, WA (US)

(72) Inventors: Michael Kale, Portland, OR (US); Saurav Sengupta, Beaverton, OR (US); Kyle Sletmoe, Portland, OR (US); Kristopher Kosmatka, Portland, OR (US); William Shogren, Beaverton, OR (US); Rory McCarthy, Portland, OR (US); Gary Hertel, Beaverton, OR (US); Ramya Krishnamoorthy, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/841,197

(22) Filed: Dec. 13, 2017

(65) Prior Publication Data
US 2019/0082199 A1 Mar. 14, 2019

Related U.S. Application Data

(60) Provisional application No. 62/558,265, filed on Sep. 13, 2017.

(51) Int. Cl.
*H04N 7/173* (2011.01)
*H04N 21/2343* (2011.01)
(Continued)

(52) U.S. Cl.
CPC ..... *H04N 21/2343* (2013.01); *H04L 65/4084* (2013.01); *H04L 65/60* (2013.01);
(Continued)

(58) Field of Classification Search
CPC ............ H04N 21/643; H04N 21/2402; H04N 21/2393; H04N 21/2343
(Continued)

(56) References Cited

U.S. PATENT DOCUMENTS 9,124,671 B2    9/2015  Roth
9,246,741 B2 *  1/2016  Eswaran ............... H04L 65/602
(Continued)

FOREIGN PATENT DOCUMENTS

WO    WO 2019/055564 A1    3/2019

OTHER PUBLICATIONS

International Search Report and Written Opinion dated Nov. 30, 2018 for International Patent Application No. PCT/US2018/050748, 14 pages.

*Primary Examiner* — Pankaj Kumar
*Assistant Examiner* — Sahar Aqil Riaz
(74) *Attorney, Agent, or Firm* — Knobbe, Martens, Olson & Bear, LLP

(57) ABSTRACT

A content streaming system and methodology for facilitating the management of content streaming. A video packaging and origination service requests streaming content that is organized according to content segments. Individual content segments will be encoded according to a plurality of encoding profiles and received at different ingress nodes within video packaging and origination service. The video packaging and origination service utilizes deterministic data generated by the different ingress nodes to determine when receipt of individual content segments is complete.

19 Claims, 7 Drawing Sheets

(51) Int. Cl.

| | |
|---|---|
| *H04N 21/643* | (2011.01) |
| *H04N 21/24* | (2011.01) |
| *H04N 21/239* | (2011.01) |
| *H04L 29/08* | (2006.01) |
| *H04L 29/06* | (2006.01) |
| *H04N 21/433* | (2011.01) |
| *H04N 21/4402* | (2011.01) |
| *H04N 21/231* | (2011.01) |
| *H04N 21/234* | (2011.01) |
| *H04N 21/8547* | (2011.01) |

(52) U.S. Cl.
CPC ....... *H04L 67/1021* (2013.01); *H04N 21/231* (2013.01); *H04N 21/234* (2013.01); *H04N 21/2393* (2013.01); *H04N 21/23106* (2013.01); *H04N 21/2402* (2013.01); *H04N 21/2407* (2013.01); *H04N 21/433* (2013.01); *H04N 21/4402* (2013.01); *H04N 21/643* (2013.01); *H04N 21/8547* (2013.01)

(58) Field of Classification Search
USPC .......................................................... 725/94
See application file for complete search history.

(56) References Cited

U.S. PATENT DOCUMENTS

| | | | |
|---|---|---|---|
| 9,332,513 B2 * | 5/2016 | Park | H04W 56/002 |
| 9,426,543 B1 | 8/2016 | Li | |
| 9,532,092 B1 | 12/2016 | Suryanarayanan et al. | |
| 10,298,968 B2 | 5/2019 | Sletmoe et al. | |
| 10,469,883 B2 | 11/2019 | Kosmatka et al. | |
| 10,542,302 B2 | 1/2020 | Hertel et al. | |
| 2005/0235047 A1 | 10/2005 | Li | |
| 2009/0034633 A1 | 2/2009 | Rodriguez | |
| 2009/0293093 A1 | 11/2009 | Igarashi | |
| 2010/0146139 A1 | 6/2010 | Brockmann | |
| 2010/0169977 A1 | 7/2010 | Dasher | |
| 2010/0177631 A1 * | 7/2010 | Chen | H04L 45/00 370/221 |
| 2010/0226428 A1 | 9/2010 | Thevathasan | |
| 2010/0235528 A1 | 9/2010 | Bocharov | |
| 2010/0250710 A1 * | 9/2010 | Cadwell | H04L 67/1008 709/219 |
| 2011/0083037 A1 * | 4/2011 | Bocharov | H04N 21/23116 714/4.11 |
| 2011/0235698 A1 * | 9/2011 | Petre | G06K 9/46 375/240.01 |
| 2011/0274179 A1 | 11/2011 | Holden | |
| 2012/0215779 A1 | 8/2012 | Lipstone | |
| 2013/0064305 A1 | 3/2013 | Karlsson | |
| 2013/0067036 A1 | 3/2013 | Nooney et al. | |
| 2013/0128947 A1 | 5/2013 | Fryer | |
| 2013/0142499 A1 | 6/2013 | Major et al. | |
| 2013/0177294 A1 * | 7/2013 | Kennberg | H04N 21/21805 386/241 |
| 2013/0198328 A1 | 8/2013 | Green | |
| 2013/0227074 A1 | 8/2013 | Odlund | |
| 2013/0322466 A1 | 12/2013 | Ucar | |
| 2013/0332971 A1 | 12/2013 | Fisher | |
| 2014/0108586 A1 | 4/2014 | Zhao | |
| 2014/0140417 A1 | 5/2014 | Shaffer | |
| 2014/0189140 A1 | 7/2014 | Takahashi | |
| 2014/0189765 A1 | 7/2014 | Green | |
| 2015/0020135 A1 | 1/2015 | Frusina | |
| 2015/0304306 A1 | 10/2015 | Ponsford | |
| 2015/0324379 A1 | 11/2015 | Danovitz | |
| 2015/0381755 A1 | 12/2015 | Li | |
| 2016/0191592 A1 * | 6/2016 | Asveren | H04L 65/80 709/231 |
| 2016/0191961 A1 * | 6/2016 | Fisher | H04N 21/234309 725/116 |
| 2016/0269279 A1 * | 9/2016 | Beshai | H04L 12/46 |
| 2017/0013040 A1 | 1/2017 | Ponekker | |
| 2017/0055007 A1 | 2/2017 | Phillips | |
| 2017/0171264 A1 | 6/2017 | Salomons | |
| 2017/0188054 A1 * | 6/2017 | Ma | H04L 67/2814 |
| 2017/0272792 A1 | 9/2017 | Bachmutsky | |
| 2017/0289223 A1 | 10/2017 | Kipp | |
| 2017/0289639 A1 | 10/2017 | Reisner | |
| 2018/0139260 A1 * | 5/2018 | Houle | H04L 65/604 |
| 2018/0184146 A1 | 6/2018 | Pichon | |
| 2019/0082197 A1 | 3/2019 | Sletmoe et al. | |
| 2019/0082198 A1 | 3/2019 | Kosmatka et al. | |
| 2019/0082201 A1 | 3/2019 | Sletmoe et al. | |
| 2019/0082217 A1 | 3/2019 | Hertel et al. | |
| 2019/0082238 A1 | 3/2019 | Sengupta et al. | |
| 2019/0090001 A1 * | 3/2019 | Smith | H04N 21/23608 |

* cited by examiner

DISTRIBUTED MULTI-DATACENTER VIDEO PACKAGING SYSTEM

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content through the utilization of a content delivery network ("CDN") service provider. As with content providers, CDN service providers also provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
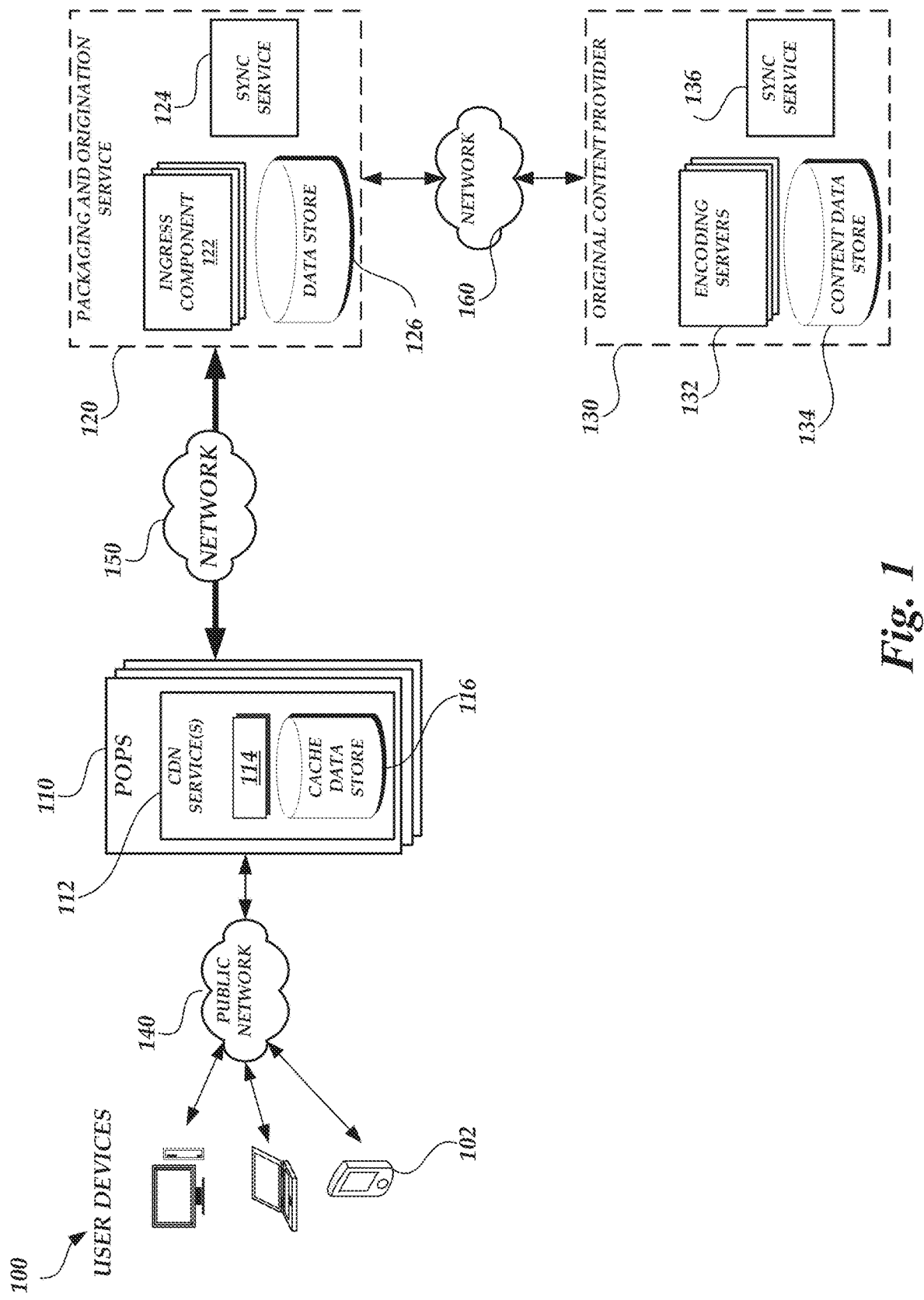
FIG. 1 is a block diagram of a content delivery environment that includes one or more user devices, a video packaging and origination service and an original content provider according to one embodiment.

Generally described, content providers can provide content to requesting users. With regard to video content, a content provider can implement a video packaging and origination service that is able to deliver video content to requesting users. Illustratively, a video packaging and origination service indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more.

To deliver content, content providers can organize requested content, such as a video file, into multiple segments that are then transmitted to requesting devices segment by segment. For example, in a video stream, each segment typically accounts for 2-10 seconds of video rendered on a receiving device. To provide content to the video packaging and origination service, individual content segments can be encoded by an encoder and transmitted to the video and origination service. Traditionally, a single processing node on the video packaging and origination service can receive an incoming stream of encoded segments and then transmit the stream to requesting user devices.

Video segments can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data are processed over a second of time. By way of example, a data file that corresponds to 1 megabyte of video data encoded in one second would be considered to have an encoding bitrate of 8 mbps (e.g., 8 megabits per second) while a lower definition video file that corresponds to 45 kilobytes of video data processed in one second would be considered to have an encoding bitrate of 360 kbps (e.g., 360 kilobits per second).

In some embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, once all the versions of an encoded segment are received by the packaging and origination service, the packaging and origination service is available to receive and process requests for encoded content. More specifically, client computing devices, through a respective software application, can request individual video segments according to the available encoded bitrates and formats as published in the manifest file.

To receive content, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

Traditionally, video packaging and origination services can maintain a single ingress node to receive individual content streams or channels corresponding to encoded segments encoded to a specific encoding profile (e.g., encoding bitrate and format). A single ingress node can utilize state information that facilitates determination that all encoding versions of the same encoded segment have been received. However, the throughput of incoming data streams is limited by characteristics of the single ingress node. For example, an ingress node may experience latencies associated with processing more complex encoded content. In such situation, a video packaging and origination service could experience additional inefficiencies by limiting the ability of the video packaging and origination service to process additional encoding channels related to other encoding profiles until the current encoded data is processed.

To address at least a portion of the inefficiencies described above with regard to single ingress nodes, aspects of the present application corresponding to a multi-ingress node system for receiving and processing encoder streams. More specifically, aspects of the present application correspond to utilization of synchronization information to allow a video packaging and origination service to utilize a plurality of ingress nodes that an independently process encoded content segments. Individual content streams can correspond to encoding of a common or same content segment according to a different encoding profile, such as a different combination of encoding bitrate and format. For example, in embodiments supporting variable bit rate encoding, a content provider may be requested to provide different encoded versions of each content segment based on the content profiles (e.g., encoding bitrate and format combination) identified in a content manifest.

Using the synchronization information, individual ingress nodes within the video packaging and origination service process the received encoded segments and generate deterministic data identifying the received encoded segment. Illustratively, the deterministic data can include encoder timestamps, segment sequence numbers, and timing information regarding operation of the encoder. The deterministic data allows the identification of a common encoded segment amongst all the received encoded segments and be stored as meta-data. As individual ingress nodes process incoming data, the video packaging and origination service can utilize the deterministic data/meta-data to identify all common encoded segments and determine whether all the requested encoded versions (e.g., by encoding profile) have been processed. If so, the particular encoded segment is ready for storage or transmission to user devices.

By allowing the utilization of a plurality of ingress nodes, aspects of the present application facilitate parallel process of different incoming content streams without requiring the need for sharing of state data by the plurality of ingress nodes. Each incoming content stream corresponding to a different encoding profile can be processed by a different or the same ingress nodes without a need to determine where a different version of the same content stream has been previously processed. Additionally, in situations in which a particular ingress node experiences some latency, additional content streams can be processed in concurrently to facilitate faster availability of streaming content to users.

FIG. 1 illustrates a general content delivery environment 100 for delivering content from original content providers to user devices. The content delivery environment 100 includes a plurality of devices 102 utilized by individual users, generally referred to as client computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

Client computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (thermostat or refrigerator), controller, digital media player, watch, eyewear, a home or car device, Internet of Things ("IoT") devices, virtual reality or augmented reality devices, and the like. Each client computing device 102 may optionally include one or more data stores (not shown in FIG. 1) including various applications or computer-executable instructions, such as web browsers, used to implement the embodiments disclosed herein. Illustrative components of a client computing device 102 will be described with regard to FIG. 2.

In some embodiments, a CDN service provider may include multiple edge locations from which a user device can retrieve content. Individual edge location 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 110 can include one or more metric information processing component 114 for processing metric information provided by client computing devices 102 and a data store 116 for maintain collected metric information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and video packaging and origination service 110 are depicted as having a single connection to the network 140, individual components of the client computing devices 102 and video packaging and origination service 110 may be connected to the network 130 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 110 may utilize any number or combination of networks.

In accordance with embodiments, the video packaging and origination service 120 includes one or more servers for receiving content from original content providers 130 and processing the content to make available a set of received encoded bitrate segments. As described in further detail below, the video packaging and origination service 120 includes a plurality of ingress components 122 utilized to receive encoded data streams from encoders encoding servers 132 from the original content providers 130. As will be explain in greater detail below, the ingress components can generate deterministic data that will facilitate a determination of when a complete set of encoded version of a content segment has been received and is ready for further processing or transmission.

The video packaging and origination service 120 can further include synchronization services 124 for generating synchronization information utilized by the encoders, such as sequence numbers corresponding to the set of encoded segments, time stamp information related to a relative time of the encoded segments or from which relative time of encoded segments will be based, and the like. As described above, the synchronization information can be utilized in the generation of deterministic data for purposes of determining when a content request has been fully completed. The video packaging and origination service 120 can further include a data store 126 for maintaining received encoded data for transmission.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices. In another example, the video packaging and origination service 120 can include one or more egress components that can utilize the content received and processed from the ingress component 122 and further process the content for transmission to user devices 102. Such egress components may be implemented in conjunction with the ingress component 122, such as in a transcoding node. In other embodiments, the egress components may be implemented and managed independently of the ingress components 122, such as in separate stand-alone computing devices.

With continued reference to FIG. 1, the content delivery environment 100 also includes original content providers 130. Illustratively, the original content provider can include a plurality of encoders 132 for generating multiple encoded streams for transmission to the video packaging and origination service 120. In one embodiment, individual encoders may generate different encode versions of a content segment according to a different encoding profile. The original content provider 130 can also include logic or other management components for determining how many encoders 132 should be utilized or how to manage the addition or removal of encoders. In some embodiments, the original content provider the original content provider 130 can further include synchronization services 136 for generating synchronization information utilized by the encoders, such as sequence numbers corresponding to the set of encoded segments, time stamp information related to a relative time of the encoded segments or from which relative time of encoded segments will be based, and the like. The video packaging and origination service 120 can further include a data store 134 for maintaining encoded data for transmission. The synchronization services 124 and 136 may work in conjunction or in a complimentary basis.

Figure 2:
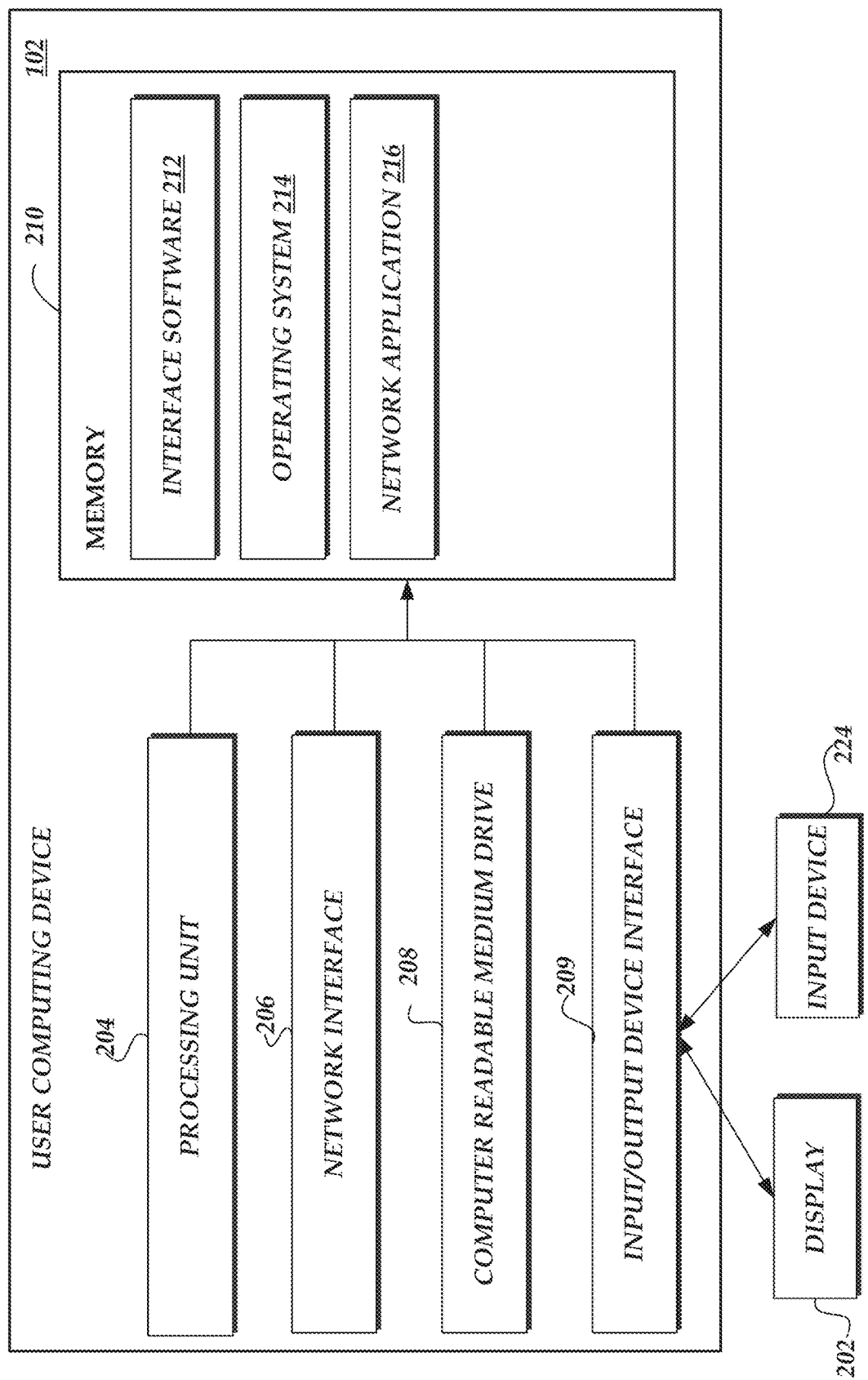
FIG. 2 is a block diagram of illustrative components of a user computing device configured to remotely process content in accordance with an illustrative embodiment.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 104 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120 or the original content providers 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes a network application 216, such as browser application or media player, for accessing content and communicating with the video packaging and origination service 120.

Figure 3:
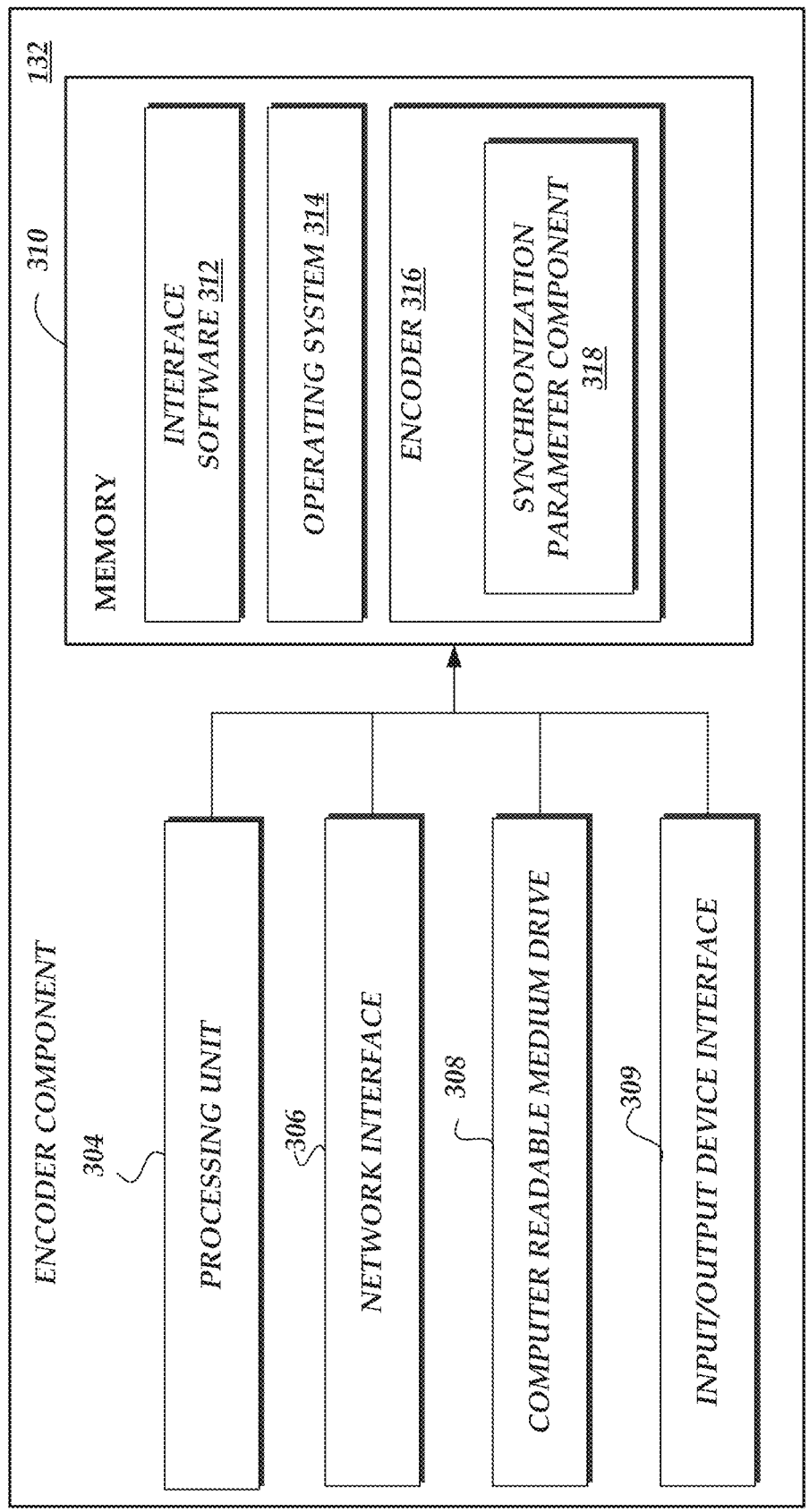
FIG. 3 is a block diagram of illustrative components of an encoder component configured to generate encoded content according to synchronization information in accordance with an illustrative embodiment.

FIG. 3 depicts one embodiment of an architecture of an illustrative server for encoding content as described herein. The general architecture of the encoder 132 depicted in FIG. 3 includes an arrangement of computer hardware and software components that may be used to implement aspects of the present disclosure. As illustrated, the encoder 132 includes a processing unit 304, a network interface 306, a computer readable medium drive 308, an input/output device interface 309, all of which may communicate with one another by way of a communication bus. The components of the encoder 132 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoder 132 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from the video packaging and origination services 102.

Additionally, the memory 310 includes an encoder component 316 for processing content segments. Additionally, the encoder component 316 can further include a synchronization parameter component 318 for utilizing the synchronization information in the encoding process to increase the likelihood that encoded segments from multiple encoders can be utilized by a video packaging and origination service 120. The synchronization information can be utilized in the generation of deterministic data as will be described below.

Figure 4:
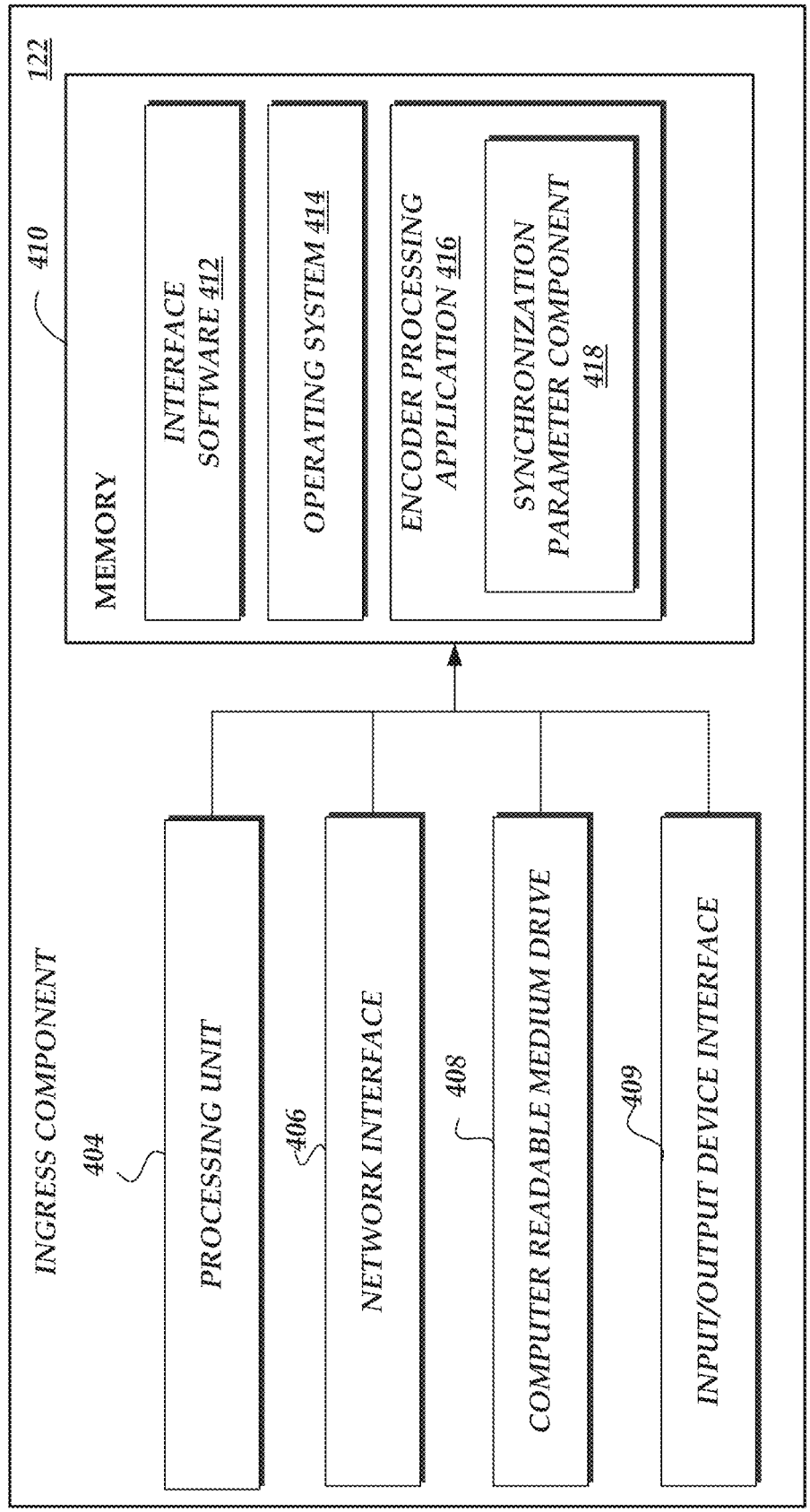
FIG. 4 is a block diagram of illustrative components of an ingress node configured to manage multiple encoder content streams in accordance with an illustrative embodiment

FIG. 4 depicts one embodiment of an architecture of an illustrative server for functioning as an ingress component 122 as described herein. As described above, the video packaging and origination service 120 includes multiple ingress components 122 (or nodes) that facilitate intake of encoded segments that have been encoded according to different encoding profiles. The general architecture of the ingress component 122 depicted in FIG. 4 includes an arrangement of computer hardware and software components that may be used to implement aspects of the present disclosure. As illustrated, the ingress component 122 includes a processing unit 404, a network interface 406, a computer readable medium drive 408, an input/output device interface 409, all of which may communicate with one another by way of a communication bus. The components of the ingress component 122 may be physical hardware components or implemented in a virtualized environment.

The network interface 406 may provide connectivity to one or more networks or computing systems, such as the network 150 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the ingress component 122 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the ingress node. The memory 410 may further include computer program instructions and other information for implementing aspects of the present disclosure. For example, in one embodiment, the memory 410 includes interface software 412 for receiving and processing content from encoders 132. Additionally, the memory 410 includes an encoder processing application 416 for processing incoming encoded content segments. Additionally, the ingress component 122 can further include a synchronization parameter component 418 for utilizing the synchronization information to generate the deterministic information as described above.

Figure 5A:
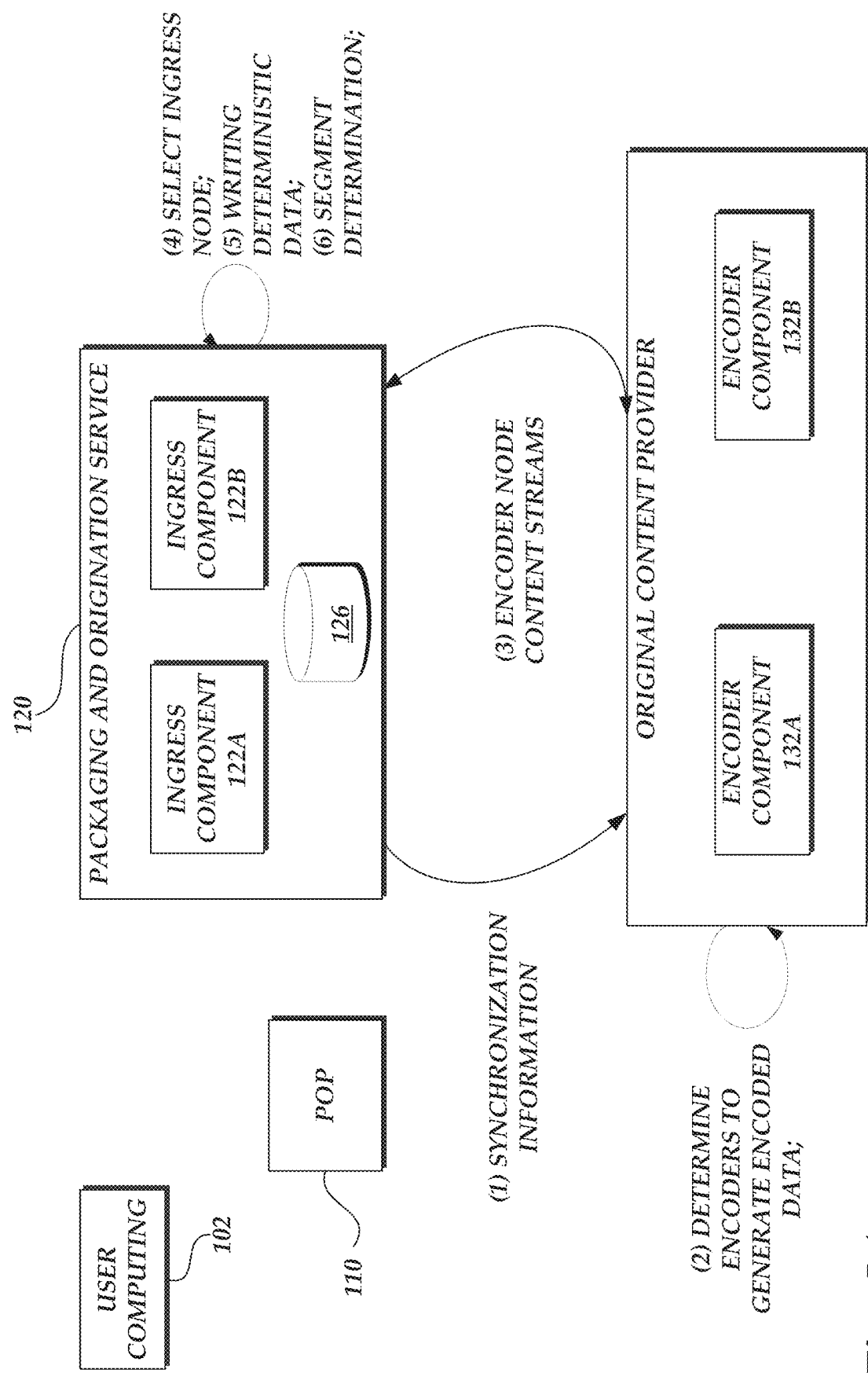
FIGS. 5A-5B are block diagrams of the content delivery environment of FIG. 1 illustrating the interaction related to video packing and origination service for obtaining encoded content for delivery to user devices.
Figure 5B:
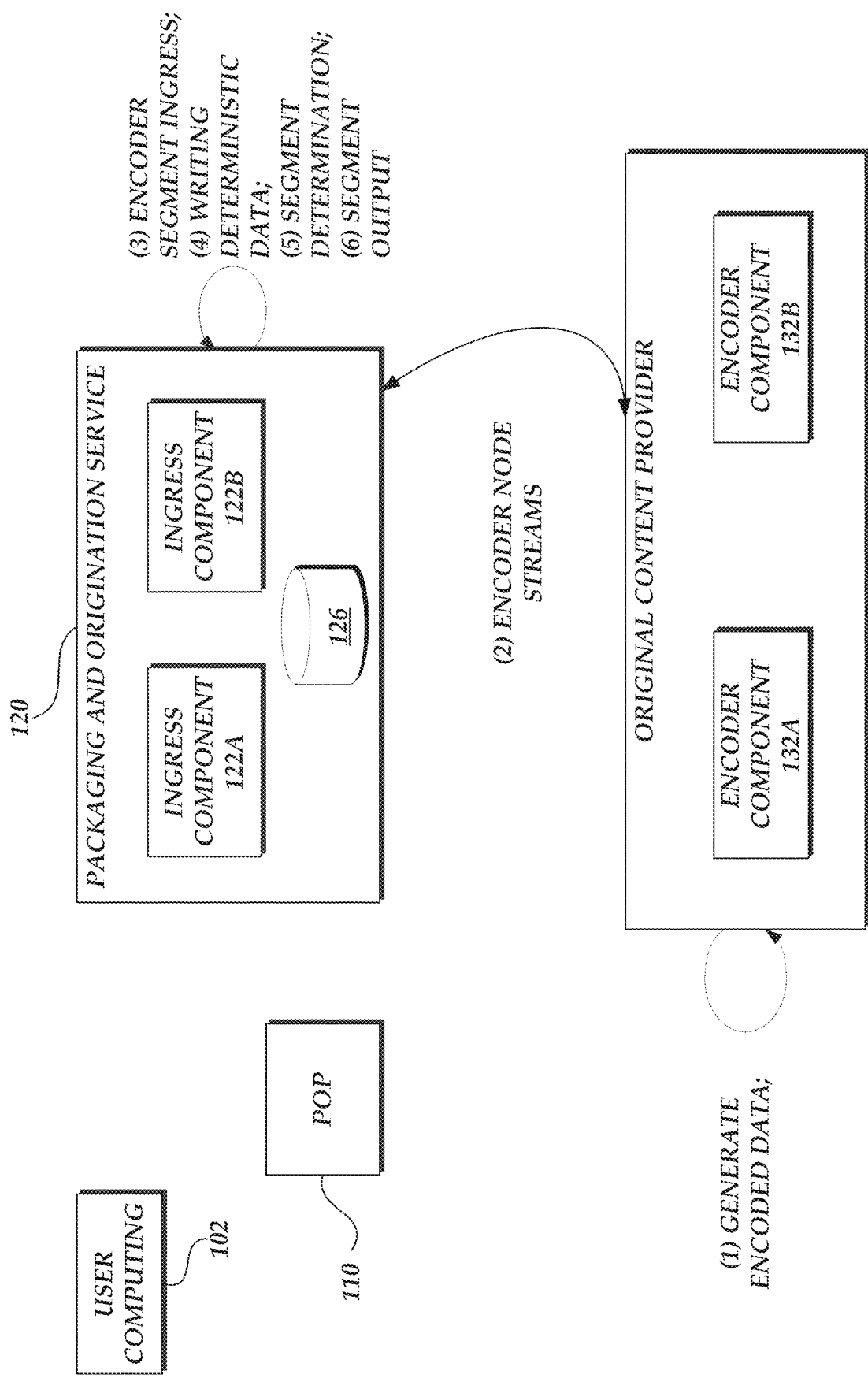

Turning now to FIGS. 5A and 5B, an illustrative interaction for the processing of content requests will be described.

At (1), the video packaging and origination service 120 can transmit synchronization information to the original content provider 130. Illustratively, the synchronization information is utilized by multiple encoders 132 to allow encoded segments from multiple encoders to be combined seamlessly or substantially seamlessly. For example, the synchronization information can include timestamp information related to a relative timestamp of individual encoded segments in the set of encoded segments. In another example, the synchronization information can include sequence numbers for the individual segments. In another example, the synchronization information can include a time of operation or other time elapsed information. The synchronization information is incorporated into the encoded segments and then utilized by the video packaging and origination service 120 to assemble the set of ordered segments, remove duplicates and identifying missing encoded segments. Although FIG. 5A illustrates the transmission of the synchronization information from the video packaging and origination service 120, in some embodiments, synchronization information may not be transmitted by the video packaging and origination service 120 and this interaction would be omitted altogether.

Illustratively, the content stream data may be transmitted by the original content provider 130 responsive to a request from a user device 102, a request from the video packaging and origination service 120, or other request/trigger. Illustratively, the encoded content can correspond to a set of encoded profiles corresponding to the encoding bitrate and format combinations that may be made available to users. For example, the video packaging and origination service 120 may provide a requesting user device 102 with a set of encoding bitrate and format combinations in order to support adaptive bitrate streaming. Accordingly, the request from the original content provider may transmit the set of identified encoding bitrates and formats or individual encoding bitrate and format combinations to supplement previously receive encoded segments. One skilled in the relevant art will appreciate that the transmission of the request or the identification of requested encoded segments (including format) can be facilitated in a number of ways.

At (2), the receiving original content provider 130 determines the number of encoders that will be utilized to generate the requested encoded content streams. Illustratively, the determination the number of encoders will generally corresponding to a plurality of encoders that generate encoded content streams for identified requested content and incorporating synchronization information. In one embodiment, the determination of the number of encoders can be based on the complexity of the encoded bitrate and formation combination, available encoder resources, an attributable cost associated with the generated encoded content segments, preferences or service levels associated with the video packaging and origination service 120, network conditions (e.g., available bandwidth, network throughput, error rates), demand from users devices (e.g., total number of requests or frequencies of requests), and the like. At (3), the original content provider 130 causes one or more encoders to generate encoded streams based on synchronization information. As described above, the video packaging and origination service 120 may provide the synchronization information. In another embodiment, the original content provider 130 can utilize self-providing synchronization, information provided by a third-party service or a combination. Illustratively, the original content provider can provide multiple encoder streams that can correspond to individual content streams corresponding to the different requested encoding profiles. For example, a first content stream can correspond to a first encoding bitrate and format (e.g., a first encoding profile) and a second content stream can correspond to a second encoding bitrate and format that is different. The encoding streams may be provided by different encoders as illustrated in FIG. 5A as encoder components 132A and 132B.

The video packaging and origination service 120 receives the plurality of incoming encoded content streams from the encoders. More specifically, at (4), a first ingress component is determined. By way of example, a first ingress component, such as ingress component 122A, of the video packaging and origination service 120 receives and processes the encoded segments from a first received stream. Such an ingress component 122 may be selected by various factors, such as geographic proximity to the original content provider, available processing resources, types or characterizations of the streaming content, original content provider specifications, video packaging and origination service specifications, and the like.

At (5), the ingress component 122A of the video packaging and origination service 120 processes the received encoded segments to generate deterministic data. Illustratively, the deterministic data can include timestamp information related to a time of play of the set of encoded segments, sequence number identifying an order of the encoded content segment in the set of encoded segments, a time of operation of the encoder and the like. The deterministic data will be illustratively utilized to identify a same content segment or matching content segments that have been encoded according to different encoding profiles and received at different ingress components. For example, four content segments sharing a common timestamp of play but encoded according to the different encoding profiles can be considered to be the same content segment. Still further, in some embodiments, the ingress component 122A generates the deterministic data as a set of meta-data utilized to access and generate outgoing content streams. In another example, the ingress component 122A can conduct quality or error checking that can be included in meta-data.

At (6) the video packaging and origination service 120 performs a determination if encoded segments determined to be matching correspond to all the requested encoded profiles. For example, to enable variable bitrate encoding, the content request may request encoded content segments according to five different encoding profiles. Accordingly, the video packaging and origination service 120 could determine via the deterministic information whether there are five matching segments covering the five requested encoding profiles. For purposes of illustration, FIG. 5A illustrates when the segment determination indicates that all the encoded segments have not been received and the encoded segment is not ready for transmission to the client.

Turning now to FIG. 5B, a subsequent interaction and processing on encoded segments will be described. The interactions illustrated in FIG. 5B are based interaction after the initial transmission of multiple encoded segment stream transmission has begun. At (1), the original content provider 130 selects or causes one or more encoders to generate encoded streams based on synchronization information or continue to generate additional encoded content streams. As described above, the video packaging and origination service 120 may provide the synchronization information. In another embodiment, the original content provider 130 can utilize self-providing synchronization, information provided by a third-party service or a combination. Illustratively, the original content provider can provide multiple encoder streams that can correspond to individual content streams corresponding to the different requested encoding profiles. For example, a first content stream can correspond to a first encoding bitrate and format (e.g., a first encoding profile) and a second content stream can correspond to a second encoding bitrate and format that is different. The encoding streams may be provided by different encoders, such as encoders 132A and 132B.

The video packaging and origination service 120 receives the plurality of incoming encoded content streams from the encoders. More specifically, at (2), a second ingress component, such as ingress component 122B, of the video packaging and origination service 120 receives and processes the encoded segments from a second or subsequent received stream. In one embodiment, the subsequent processing of the second content stream may occur in parallel to the processing of the first content stream. For example, the processing of the first content stream by ingress component 122A (FIG. 5A) may experience a latency.

At (3), the ingress component 122B of the video packaging and origination service 120 processes the received encoded segments to generate deterministic data. Illustratively, the deterministic data can include timestamp information related to a time of play of the set of encoded segments, sequence number identifying an order of the encoded content segment in the set of encoded segments, a time of operation of the encoder and the like. The deterministic data will be illustratively utilized to identify a same content segment or matching content segments that have been encoded according to different encoding profiles and received at different ingress components. For example, four content segments sharing a common timestamp of play but encoded according to the different encoding profiles can be considered to be the same content segment.

At (5), the video packaging and origination service 120 performs a determination if encoded segments determined to be matching correspond to all the requested encoded profiles. For example, to enable variable bitrate encoding, the content request may request encoded content segments according to five different encoding profiles. Accordingly, the video packaging and origination service 120 could determine via the deterministic information whether there are five matching segments covering the five requested encoding profiles. For purposes of illustration, FIG. 5B illustrates when the segment determination indicates that all the encoded segments have been received and the encoded segment is not ready for transmission to the client. Accordingly, at (6), the video packaging and origination service 120 creates a segment output of all the processed encoded segments, which can include writing to storage or indicating to an egress node that transmission can begin.

Figure 6:
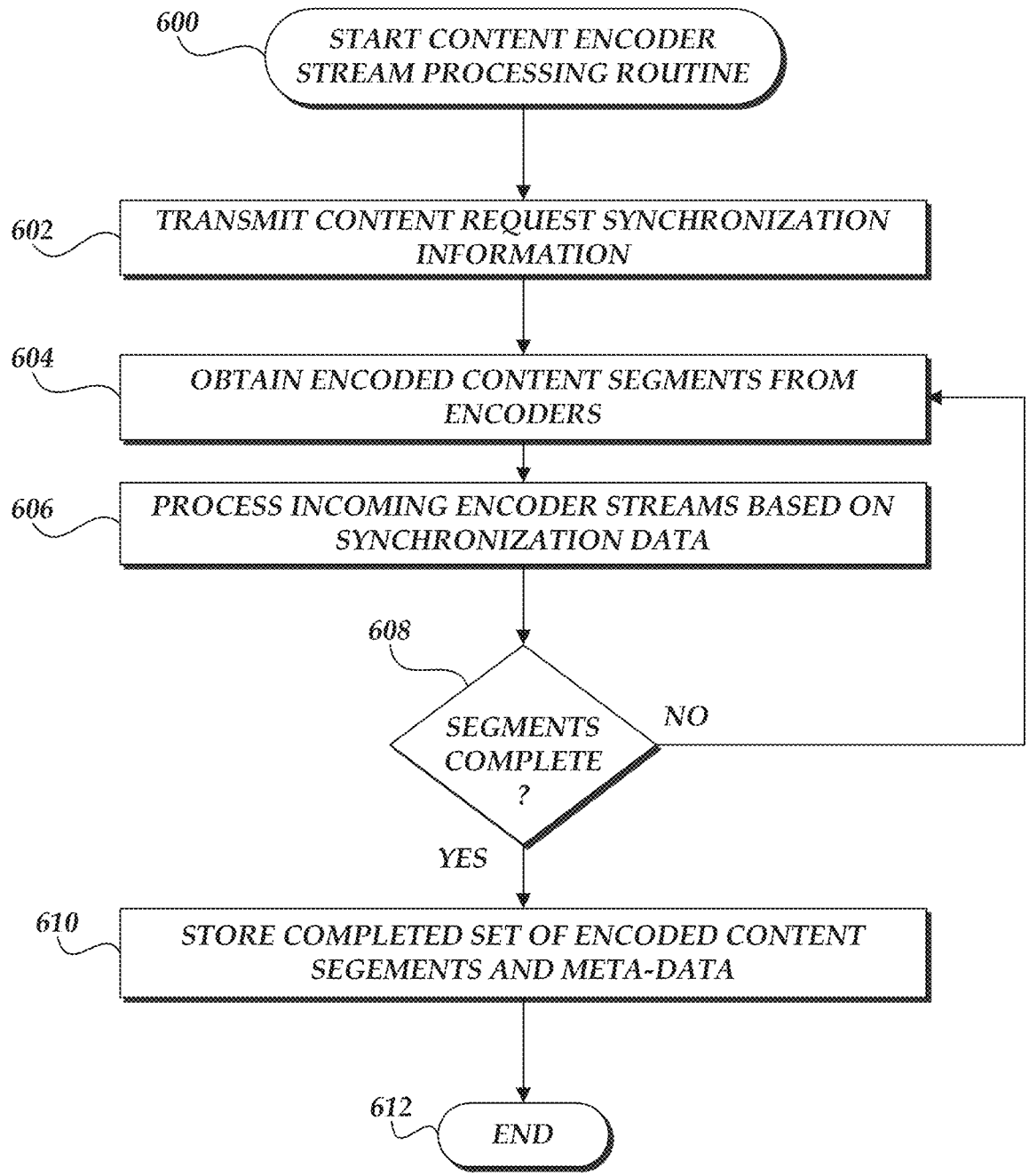
FIG. 6 is a flow diagram illustrative of a content processing routine implemented by a video packaging and origination service.

Turning now to FIG. 6, a routine 600 utilized by the video packaging and origination service 120 to receive and process multiple encoder streams will be described. Routine 600 may be illustratively implemented by an ingress component 122.

At block 602, the video packaging and origination service 120 can optionally transmit synchronization information to the original content provider 130. Illustratively, the synchronization information is utilized by multiple encoders 132 to allow encoded segments from multiple encoders to be combined seamlessly or substantially seamlessly. For example, the synchronization information can include timestamp information related to a relative timestamp of individual encoded segments in the set of encoded segments. In another example, the synchronization information can include sequence numbers for the individual segments. In another example, the synchronization information can include a time of operation or other time elapsed information. The synchronization information is incorporated into the encoded segments and then utilized by the video packaging and origination service 120 to assemble the set of ordered segments, remove duplicates and identifying missing encoded segments. In embodiments in which the video packaging and origination service 120 does not transmit synchronization information, such as if the original content provider 130 or other service provides the synchronization information, block 604 may be omitted.

Responsive to a request or trigger, as described above, the original content provider 130 begins transmitting a plurality of encoded content streams to the video packaging and origination service 120 and incorporating received/accessed synchronization information. In some embodiments, the encoders 132B and 132A, may be configured to transmit different content streams corresponding to a common encoded segment or set of segments encoded according to different encoding profiles. At block 604, the video packaging and origination service 120 receives the plurality of incoming encoded content streams from the encoders. Illustratively, the designation of a specific ingress component 122 may be based on algorithms incorporating geographic or network information, random selection, weighted selection, load balancing, client specified information, encoding format, and the like. For example, the video packaging and origination service 120 may maintain ingress components 122 that have been optimized to receive different encoding profiles. In another example, the video packaging and origination service 120 can utilize load balancing to determine which ingress component 122 is better suited to receive an incoming stream at the time it is received. Other variations are also possible.

At block 606, the video packaging and origination service 120 processes the received encoded segments. For example, the video packaging and origination service 120 can be adjustments or error correction for any of the selected encoded segments. In other embodiment, if the synchronization information does not ensure perfectly compatible encoded segments, the video packaging and origination service 120 can extrapolate additional segments or portions to facilitate combination. Still further, in some embodiments, the ingress component 122 of the video packaging and origination service 120 generates deterministic data included in a set of meta-data utilized to access and generate outgoing content streams. Illustratively, the deterministic data can include timestamp information related to a time of play of the set of encoded segments, sequence number identifying an order of the encoded content segment in the set of encoded segments, a time of operation of the encoder and the like. In another example, the ingress component 122 or content management service 126 can conduct quality or error checking that can be included in meta-data.

At decision block 608, a determination is made as to whether additional encoder segments streams still need to be received. As described above, the video packaging and origination service 120 performs a determination if encoded segments determined to be matching correspond to all the requested encoded profiles. For example, to enable variable bitrate encoding, the content request may request encoded content segments according to five different encoding profiles. Accordingly, the video packaging and origination service 120 could determine via the deterministic information whether there are five matching segments covering the five requested encoding profiles. If additional encoded segments remain unreceived or not fully processed, the routine 600 returns to block 604 to receive the additional encoder streams. If not, the routine 600 proceeds to block 610.

At block 610, the video packaging and origination service 120 stores the cumulative set of encoded segments for delivery to user devices 102. As described above, the video packaging and origination service 120 can also associate or store meta-data associated with the segments. Alternatively, the video packaging and origination service 120 can also interact with egress nodes or generate a notification that the collected content is ready for transmission. Routine 600 terminates at block 612 or starts a new iteration of routine 600.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage streaming content comprising:
one or more computing devices associated with a content management system, wherein the content management system is configured to:
transmit a request for streaming content encoded according to a plurality of encoding profiles that includes a first encoding profile and a second encoding profile, wherein the streaming content is organized into a set of segments associated with the encoding profiles;
one or more computing devices associated with a first ingress component, wherein the first ingress component is configured to:
obtain at a first ingress node a first set of segments encoded according to the first encoding profile; and identify deterministic data associated with the first set of segments;

one or more computing devices associated with a second ingress component wherein the second ingress component is configured to:
obtain at a second ingress node a second set of segments encoded according to the second encoding profile, the first ingress node different from the second ingress node; and
identify deterministic data associated with the second set of segments;

wherein the content management system is further configured to delay designation of streaming content availability for transmission to user devices based on a determination that the deterministic data for the first and second sets of segments indicates that the first and second sets of segments are not same content segments that have been encoded according to different encoding profiles.

2. The system of claim 1, wherein the deterministic data includes an encoder timestamp.

3. The system of claim 1, wherein the deterministic data includes a sequence number in a set of sequence numbers corresponding to the requested content.

4. A computer-implemented method to manage transmission of content comprising:
obtaining a first encoded segment at a first ingress node, the first encoded segment encoded according to a first encoding profile and corresponding to a first segment in a set of segments;
obtaining a second encoded segment at a second ingress node, the second encoded segment encoded according to a second encoding profile and corresponding to the first segment in the set of segments;
determining a request for streaming content is complete based on a comparison of deterministic data associated with at least the first and second encoded segments that indicates that the first and second encoded segments comprise same content segments that have been encoded according to different encoding profiles; and
delaying designation of streaming content availability for transmission to user devices based on a determination that the deterministic data for the first and second encoded segments indicates that the first and second encoded segments are not same content segments that have been encoded according to different encoding profiles.

5. The computer-implemented method of claim 4, further comprising identifying synchronization information for utilization in obtaining the first and second encoded segments.

6. The computer-implemented method of claim 4 further comprising transmitting a request for synchronization information for utilization in obtaining the first and second encoded segments.

7. The computer-implemented method of claim 4, wherein the deterministic data includes an encoder timestamp.

8. The computer-implemented method of claim 4, wherein the deterministic data includes a sequence number associated with the set of segments.

9. The computer-implemented method of claim 4 further comprising obtaining a third encoded segment at a third ingress node, the third encoded segment encoded according to a third encoding profile and corresponding to the first segment in the set of segments.

10. The computer-implemented method of claim 9, further comprising determining the request for streaming content is complete based on a comparison of deterministic data associated with at least the first and second encoded segments includes determining the request for streaming content is complete based on a comparison of deterministic data associated with at least the first, second, and third encoded segments.

11. The computer-implemented method of claim 4, wherein the first encoding profile and the second encoding profile correspond to different encoding bitrates.

12. The computer-implemented method of claim 4, wherein the first encoding profile and the second encoding profile correspond to different encoding formats.

13. The computer-implemented method of claim 4 further comprising causing a transmission of the first and second encoded segments responsive to determining the request for streaming content is complete based on the comparison of the deterministic data associated with at least the first and second encoded segments.

14. A computer-implemented method to manage transmission of content comprising:
obtaining a first set of encoded segments corresponding to an identifiable segment in a set of segments by at least two ingress nodes, wherein individual encoded segments of the first set of encoded segments are encoded according to one of a plurality of encoding profiles;
causing transmission of a second set of encoded segments corresponding to the first set of encoded segments based on data from the at least two ingress nodes indicating the second set of encoded segments corresponds to segments corresponding to the identifiable segment that has been encoded according to the plurality of encoding profiles; and
delaying the transmission of the second set of encoded segments based on the data indicating that segments of the second set of encoded segments do not correspond to the identifiable segment.

15. The computer-implemented method of claim 14 further comprising obtaining synchronization information for utilization by the at least two ingress nodes.

16. The computer-implemented method of claim 14, wherein the data from the at least two ingress nodes correspond to data indicative of a timestamp or segment sequence number.

17. The computer-implemented method of claim 14, wherein the plurality of encoding profiles correspond to one of an encoding bitrate or format.

18. The computer-implemented method of claim 14 further comprising delaying transmission of the second set of encoded segments based on data indicating at least one encoded segment encoded to one of the plurality of encoding profiles has not been processed by the at least two ingress nodes.

19. The computer-implemented method of claim 14, further comprising storing the second set of encoded segments.

* * * * *